United States Patent
Soomro et al.

(10) Patent No.: US 12,444,035 B2
(45) Date of Patent: Oct. 14, 2025

(54) PALLET INSPECTION SYSTEM AND ASSOCIATED METHODS

(71) Applicant: CHEP Technology Pty Limited, Sydney (AU)

(72) Inventors: Khurram Soomro, Ocoee, FL (US); Christopher J. Gerou, Orlando, FL (US); Sergio Conejo, Madrid (ES); Moazam Soomro, Orlando, FL (US); Gonzalo Vaca Castano, Orlando, FL (US)

(73) Assignee: CHEP Technology Pty Limited, Sydney (AU)

( * ) Notice: Subject to any disclaimer, the term of this patent is extended or adjusted under 35 U.S.C. 154(b) by 343 days.

(21) Appl. No.: 18/045,579

(22) Filed: Oct. 11, 2022

(65) Prior Publication Data
US 2023/0114085 A1    Apr. 13, 2023

Related U.S. Application Data

(60) Provisional application No. 63/262,452, filed on Oct. 13, 2021.

(51) Int. Cl.
*G06T 7/00* (2017.01)
*B65G 43/08* (2006.01)
*G06V 10/764* (2022.01)

(52) U.S. Cl.
CPC ............ *G06T 7/0004* (2013.01); *B65G 43/08* (2013.01); *G06V 10/764* (2022.01);
(Continued)

(58) Field of Classification Search
CPC ......... G06T 7/0004; G06T 2207/30136; G06T 2207/20081; G06T 2207/20084;
(Continued)

(56) References Cited

U.S. PATENT DOCUMENTS 6,892,592 B2 * 5/2005 Gatteschi ............. B23P 19/041
                                                    73/865.8
7,150,598 B2 * 12/2006 Smets .................... B65G 59/08
                                                    414/754
(Continued)

FOREIGN PATENT DOCUMENTS

EP        0823629 A2      2/1998
EP        2667185 A1     11/2013
(Continued)

OTHER PUBLICATIONS

International Search Report and Written Opinion for International Application No. PCT/US2022/077936, dated Mar. 3, 2023, (16 pages), United States Patent and Trademark Office, US.
(Continued)

*Primary Examiner* — Michael S Osinski
(74) *Attorney, Agent, or Firm* — Alston & Bird LLP

(57) ABSTRACT

A pallet inspection system includes a conveyor to move a pallet that is to be inspected. The pallet includes a top deck and a bottom deck separated by spaced apart support blocks positioned therebetween, with nails being used to secure the top and bottom decks to the support blocks. Cameras are positioned to generate images of the pallet as the pallet is moved on the conveyor. A processor is coupled to the cameras and receives the images for processing. The processing includes executing a first algorithm on the images to tag the images having support blocks visible therein, and executing a second algorithm on the tagged images to detect nails having exposed tips.

19 Claims, 17 Drawing Sheets

(52) U.S. Cl.
CPC ............... *B65G 2201/0267* (2013.01); *B65G 2203/0208* (2013.01); *B65G 2203/041* (2013.01); *B65G 2203/044* (2013.01); *G06T 2207/30136* (2013.01)

(58) Field of Classification Search
CPC ....... G06T 2200/04; G06T 2207/30108; G06T 2207/30164; B65G 43/08; B65G 2201/0267; B65G 2203/0208; B65G 2203/041; B65G 2203/044; B65G 61/00; G06V 10/764; G06V 10/774; G06V 10/776; G06V 10/82; B23P 19/041; B25J 9/1687; B25J 9/1697; G01N 21/8851; Y10T 29/53317; Y10T 29/49771; Y10T 29/49718
See application file for complete search history.

(56) References Cited

U.S. PATENT DOCUMENTS

| | | | |
|---|---|---|---|
| 7,340,971 B2 * | 3/2008 | Carter | G01M 5/0091 73/865.9 |
| 10,984,378 B1 * | 4/2021 | Eckman | G06K 19/06131 |
| 11,875,502 B2 * | 1/2024 | Schultz | G06T 17/00 |
| 2006/0242820 A1 | 11/2006 | Townsend et al. | |
| 2006/0249436 A1 * | 11/2006 | Hardman, Jr. | B07C 5/34 209/699 |
| 2007/0108682 A1 * | 5/2007 | Holliger | B23P 19/041 269/37 |
| 2007/0163099 A1 * | 7/2007 | Townsend | G06T 7/0004 29/407.01 |
| 2009/0169353 A1 * | 7/2009 | Townsend | B23P 19/041 414/222.11 |
| 2012/0284987 A1 | 11/2012 | Townsend et al. | |
| 2014/0232826 A1 * | 8/2014 | Halata | G06T 7/70 348/46 |
| 2015/0105892 A1 | 4/2015 | Townsend et al. | |
| 2015/0306714 A1 * | 10/2015 | Rahman | G01M 99/00 73/865.8 |
| 2016/0044286 A1 | 2/2016 | Saptharishi et al. | |
| 2016/0070988 A1 | 3/2016 | Romanenko | |
| 2016/0171285 A1 | 6/2016 | Kim | |
| 2016/0231254 A1 * | 8/2016 | Pirot | G01N 21/9054 |
| 2017/0343481 A1 | 11/2017 | Jahanshahi et al. | |
| 2021/0129334 A1 * | 5/2021 | Kanunikov | B65G 61/00 |
| 2021/0133666 A1 | 5/2021 | Eckman et al. | |
| 2022/0172335 A1 * | 6/2022 | Mian | G01N 21/8806 |
| 2022/0194705 A1 * | 6/2022 | Hatteland | B65G 1/0485 |
| 2022/0375067 A1 * | 11/2022 | Osunkwo | G06T 7/0004 |
| 2023/0211382 A1 * | 7/2023 | Soomro | G06N 3/045 209/577 |
| 2023/0278221 A1 * | 9/2023 | Simon | B25J 9/1692 700/217 |
| 2023/0294918 A1 * | 9/2023 | Zheng | B25J 11/00 |
| 2024/0286289 A1 * | 8/2024 | Ueda | B25J 9/1687 |
| 2024/0286848 A1 * | 8/2024 | McCarthy | B08B 1/52 |
| 2024/0400307 A1 * | 12/2024 | Gao | B65G 59/063 |
| 2024/0412339 A1 * | 12/2024 | Gadi | G06V 10/30 |
| 2025/0066145 A1 * | 2/2025 | Shipley | B25J 9/1682 |

FOREIGN PATENT DOCUMENTS

| | | |
|---|---|---|
| JP | H 09159433 A | 6/1997 |
| JP | 2009042193 A | 2/2009 |

OTHER PUBLICATIONS

Japanese Office Action for Application No. 2024-522130, dated Dec. 24, 2024.
Australian Exam Report for Application No. 2022366938, dated Aug. 26, 2025, 6 pages.
Malik, et al., "Targeted Rubbish Assorting System Handler (Trash)", *International Research Journal of Engineering and Technology (IRJET)*, vol. 8, issue 7, Jul. 7, 2021.
Partial Supplementary European Search Report for Application No. 22881966.0, dated Aug. 18, 2025, 16 pages.

\* cited by examiner

PALLET INSPECTION SYSTEM AND ASSOCIATED METHODS

RELATED APPLICATIONS

This application claims the benefit of U.S. provisional application Ser. No. 63/262,452 filed Oct. 13, 2021, which is hereby incorporated herein in its entirety by reference.

TECHNICAL FIELD

The present invention relates to pallet inspection, and more particularly, to determining nail defects on a pallet.

BACKGROUND

Wooden pallets are used to transport a variety of bulk goods and equipment as required in manufacturing and warehousing operations. In high volume industries, pallet pools provide a lower total industry cost than one-way pallets.

After the bulk goods and equipment are off loaded from the pooled pallets, the pallets are returned to pallet inspection and repair facilities. A damaged pallet will be discarded if the repairs are too extensive. Otherwise, if the damage is minor, then the pallet is repaired and painted before being returned to service.

SUMMARY

A pallet inspection system includes a conveyor to move a pallet that is to be inspected. The pallet includes a top deck and a bottom deck separated by spaced apart support blocks positioned therebetween, with nails being used to secure the top and bottom decks to the support blocks. A plurality of cameras are positioned to generate images of the pallet as the pallet is moved on the conveyor. A processor is coupled to the plurality of cameras and receives the images for processing. The processing includes executing a first algorithm on the images to tag the images having support blocks visible therein, and executing a second algorithm on the tagged images to detect nails having exposed tips.

The pallet inspection system may further include a first sensor positioned before the plurality of cameras, and a second sensor positioned after the plurality of cameras. The processor may be configured to receive a first set of images of the pallet in response to the first sensor being activated, and receive a second set of images of the pallet in response to the second sensor being activated.

The first and second sensors comprise photoelectric sensors. The first and second algorithms may be executed by the processor so that nails having exposed tips are detected in real time.

The plurality of support blocks are spaced apart to form a pair of outer rows and a center row therebetween, with the outer rows including corner support blocks. Each camera may be in focus on the support blocks in one of the rows and out-of-focus on the support blocks in the other rows.

The plurality of cameras may be divided into first and second camera sets, with the first camera set being directed toward an entrance of the pallet inspection system, and the second camera set being directed toward an exit of the pallet inspection system.

The first camera set may provide a front perspective of the plurality of support blocks, and the second camera set may provide a rear perspective of the plurality of support blocks, with the first and second camera sets collectively providing images on all sides of each support block.

The first camera set may include cameras adjacent each side of the conveyor, and the second camera set may include cameras adjacent each side of the conveyor. Each camera may be configured as a color camera.

The first algorithm may include an image classification algorithm, and the second algorithm may include an object detection algorithm.

The image classification algorithm may be configured to classify each image as one of the following: a block image corresponding to a support block being in focus, a non-block image corresponding to a support block being out-of-focus, or a background image corresponding to neither a support block being in focus or a support block being out-of-focus. The block images may be tagged by the image classification algorithm.

The object detection algorithm may be configured to place a bounding box around the support block in each block image, and in response to an exposed nail tip being detected, place a bounding box around the exposed nail tip.

The object detection algorithm may be configured to detect other nail defects in addition to nails having exposed tips, with the other nail defects being ignored by the processor.

Another aspect is directed to a method for operating a pallet inspection station as described above. The method includes operating a conveyor to move a pallet that is to be inspected, the pallet comprising a top deck and a bottom deck separated by a plurality of spaced apart support blocks positioned therebetween, and with nails being used to secure the top and bottom decks to the plurality of support blocks. The method further includes operating a plurality of cameras positioned to generate images of the pallet as the pallet is moved on the conveyor, and receiving the images for processing. The processing may include executing a first algorithm on the images to tag the images having support blocks visible therein, and executing a second algorithm on the tagged images to detect nails having exposed tips.

Another aspect is directed to a method for training an object detection algorithm as described above. The method includes creating a database of images of pallets with protruding nails and other nail defects, defining different categories that are to be detected in the database, and annotating the images in the database corresponding to the different categories to be detected. A model is trained using machine learning to learn a function that produces mappings between the annotated images and the different categories to be detected. The method further includes analyzing the output data from the model, and optimizing the model based on the analyzed output data.

Yet another aspect is directed to a method for operating an object detect algorithm as described above. The method includes receiving images of pallets to be inspected, and executing a machine learning model trained to learn a function that produces mappings between annotated images of pallets with protruding nails and other nail defects to be detected. The annotated images correspond to different categories to be detected. The method further includes identifying objects by location in the received images corresponding to the different categories to be detected, providing confidence values for the categories that were detected in the received images, and identifying the pallets with protruding nail based on the confidence values.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Nail defects in a pallet are a concern, particularly when the nail defect is a protruding nail. A protruding nail is when a tip of a nail is exposed. The form factor of a pallet is not affected, but the protruding nail needs to be detected during inspection of the pallet so the defect can be corrected.

Typically, when a worker manually handles a pallet, their hands are placed within one or more pockets on the pallet. Each side of the pallet has a pocket which is formed between the top and bottom decks that are separated by support blocks positioned therebetween. The worker could potentially be injured when their hand is placed within a pocket with a protruding nail.

Figure 1:
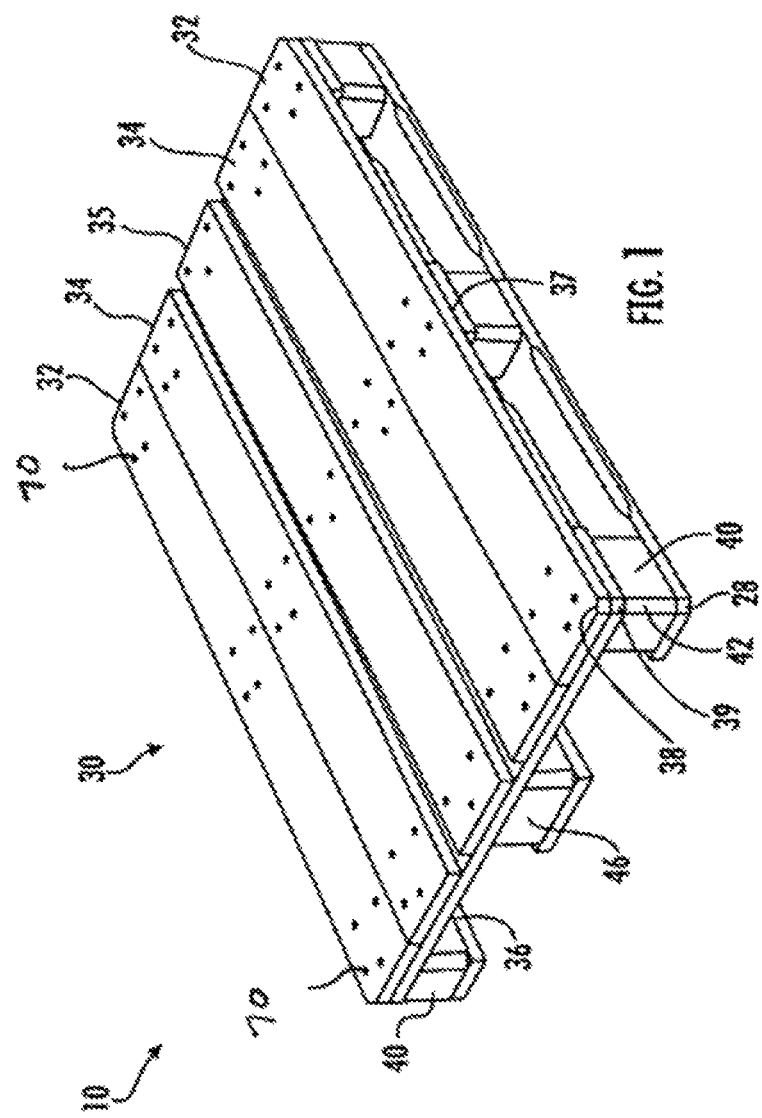
FIG. 1 is a top perspective view of a wooden pallet in which various aspects of the disclosure may be implemented.
Figure 2:
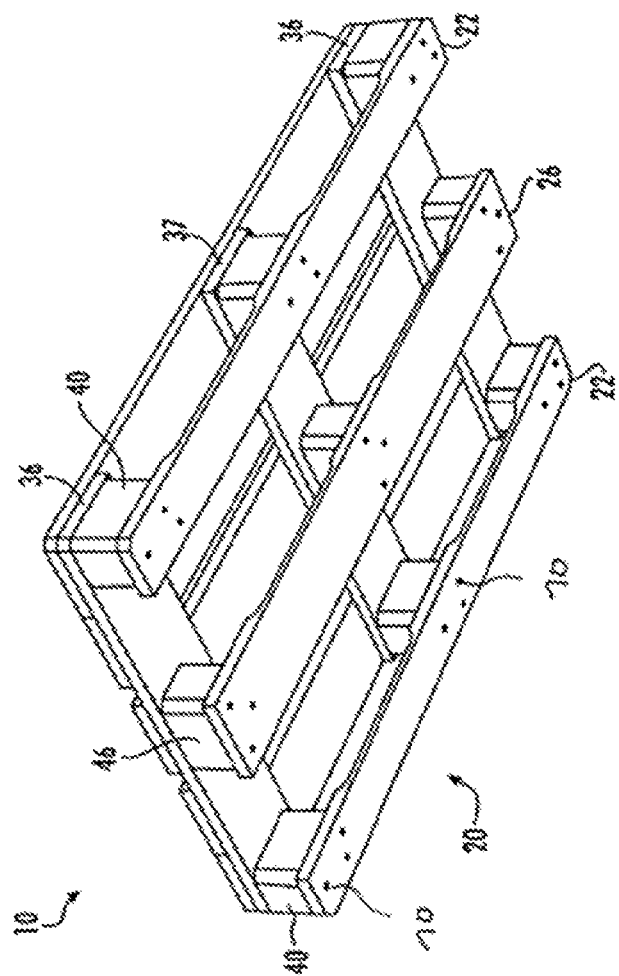
FIG. 2 is a bottom perspective view of the wooden pallet illustrated in FIG. 1.
Figure 3:
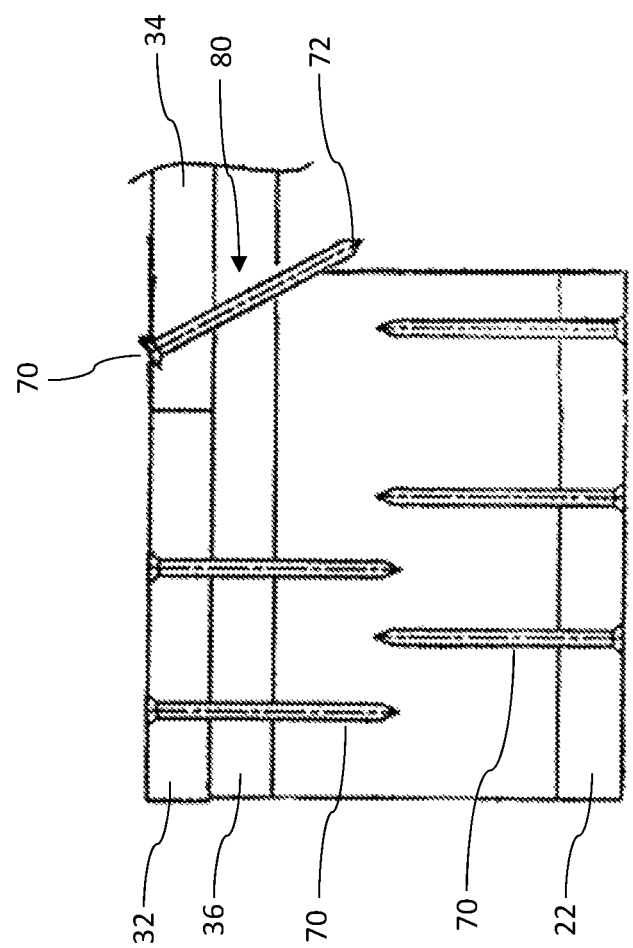
FIG. 3 is a partial cross-sectional view of the wooden pallet illustrated in FIG. 1 with a protruding nail.

Referring now to FIGS. 1-3, an example wooden pallet 10 will be discussed. The wooden pallet 10 is for discussion purposes on nail placement in general within a wooden pallet 10. The wooden pallet 10 as illustrated is not to be limiting as other wooden pallet configurations are readily available.

The wooden pallet 10 includes a bottom deck 20, a top deck 30, and a plurality of wooden support blocks 40, 46 coupled between the bottom and top decks. The support blocks 40, 46 form a gap 50 (i.e., pockets) between the bottom and top decks 20, 30 for receiving a lifting member, such as fork lift tines.

The top deck 30 includes a pair of spaced apart wooden end deck boards 32, and wooden intermediate deck boards 34 positioned between the end deck boards 32. Also included within the top deck 30 are a pair of spaced apart wooden connector boards 36 and a wooden intermediate connector board 37. The connector boards 36 and the intermediate connector boards 37 are orthogonal to the end deck boards 32 and the intermediate deck boards 34. The end deck boards 32 and the intermediate deck boards 34 are positioned on the connector boards 36 and are directly coupled to the support blocks 40, 46 via nails 70.

The bottom deck 20 includes bottom deck boards 22, 26 orientated in the same direction as the end deck boards 32 and the intermediate deck boards 34 in the top deck 30. The bottom deck boards 22, 26 are also directly coupled to the support blocks 40, 46 via nails 70.

The support blocks include corner support blocks 40 and center support blocks 46 between the corner support blocks 40. In total, there are 9 support blocks 40, 46 positioned in rows of 3. The outer rows each include a pair of outer support blocks 40 and a single center support block 46, and the center row includes all center support blocks 46. The actual number of support blocks may vary based on the configuration and size of the wooden pallet 10.

The corner support blocks 40 and the center support blocks 46 each have a rectangular shape. In other configurations, one or more of the supports blocks 40, 46 may have a non-rectangular shape, such as a circular shape.

A partial cross-sectional view of the wooden pallet 10 is provided in FIG. 3 to illustrate placement of the nails 70 within the support blocks 40, 46. When the wooden pallet 10 is formed, nails enter from the bottom and top decks 20, 30 into the support blocks 40, 46.

A protruding nail 80 may occur when a nail operator places the nail 70 off center causing the tip 72 to be exposed. A protruding nail 80 may also occur when a nail 70 is driven into the location of an existing nail and bounces off the existing nail causing the tip 72 to be exposed. In other cases, wear and tear on the wooden pallet 10 may cause part of a support block 40, 46 to break off resulting in a nail tip 72 being exposed. A protruding nail 80 is not limited to protruding from support blocks 40, 46. A protruding nail 80 may also protrude from other regions or areas of the pallet 10, such as from one of the connector boards 36, for example.

Detecting protruding nails 80 in a wooden pallet 10 is challenging. As will be described in detail below, cameras are used to collect images of each wooden pallet 10 during inspection. The images are sent to a processing unit for processing. The processing unit executes a machine learning object detection algorithm that has been trained to detect protruding nails 80. How the algorithm is trained and executed will also be described in detail below. The processing unit may be a graphics processing unit (GPU), a central processing unit (CPU) or an edge computing device, for example.

Figure 4:
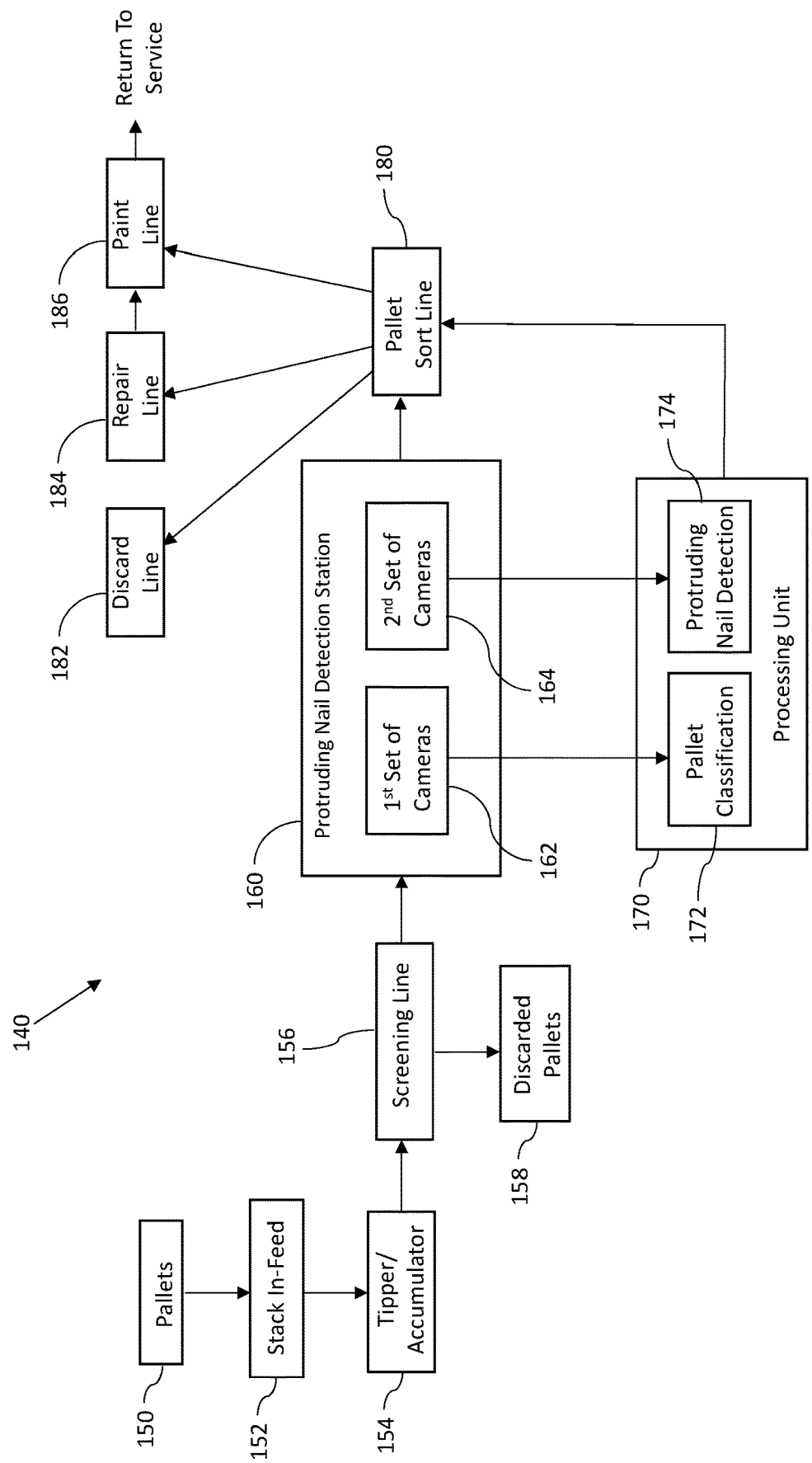
FIG. 4 is a block diagram of a pallet inspection system in which various aspects of the disclosure may be implemented.

An overview of a pallet inspection system 140 will be discussed with reference to FIG. 4. Pooled pallets 10 from different customers are returned to a pallet pooling company for inspection, and if necessary, repair, before the pallets 10 are returned to service.

Prior to inspection, the pallets 10 are provided to a stack in-feed 152. The stack in-feed 152 squares each stack of pallets before being passed to a tipper/accumulator 154. The tipper/accumulator 154 provides a steady stream of spaced apart pallets 10 to a conveyor, for example. As the pallets 10 are moved on the conveyor, they pass through a preparation screening line 156.

In the preparation screening line 156, each pallet 10 is visually inspected by a human operator to remove any loose debris or trash that may affect inspection. If necessary, the human operator will also make minor repairs. In some cases, a pallet 10 may be discarded during the preparation screening line 156 if it is damaged too badly, as indicated by block 158.

From the preparation screening line 156, each pallet 10 is moved to a protruding nail detection station 140 for inspection. The pallets 10 are inspected for pallet classification, and to detect protruding nails 80.

Pallet classification by the protruding nail detection station 160 is to determine if a pallet 10 being inspected belongs to the pallet pooling company operating the pallet inspection system 140. A first set of cameras 162 within the protruding nail detection station 166 generate upper and lower images of each pallet 10. The images may be video images or still images. The images may be in color or monochrome, and are provided to a processing unit 170. The processing unit 170 executes a first algorithm for pallet classification 172. The first algorithm may be a machine learning (ML) image classification algorithm, for example.

The image classification algorithm compares the generated image data to an expected profile. The expected profile is used for pallet classification. The image classification algorithm labels or tags each image as to whether or not the pallet 10 belongs to the pallet pooling company. For example, if 75 images were generated of the pallet 10, and a majority of these images are tagged as belonging to the pallet pooling company, then the pallet 10 is classified as such.

The image classification algorithm associated with the first set of cameras 162 may also detect certain obvious nail defects, such as raised nails and free standing nails. In a raised nail, the head of the nail extends slightly above the top deck. A raised nail could potentially impact any product placed on the pallet. In a free standing nail, the head and body of the nail are visible but not the tip.

Protruding nail detection by the protruding nail detection station 160 is to determine a protruding nail 80 in a pallet 10. A second set of cameras 164 within the protruding nail detection station 160 generate images of the sides of each pallet 10. The images are in color, and are provided to the processing unit 170. Alternatively, the images may be monochrome. The processing unit 170 executes a second algorithm that is trained for detecting protruding nails 80. The second algorithm may be a machine learning (ML) object detection algorithm, for example.

The pallet sort line 180 receives the pallets 10 as they exit the protruding nail detection station 160. The pallet sort line 180 queries the processing unit 170 to determine pallet classification. If the inspected pallet 10 does not belong to the pallet pooling company operating the pallet inspection system 140, then the pallet 10 is sent to a discard line 182.

In the illustrated embodiment, the protruding nail detection station 160 includes first and second sets of cameras 162, 164. In an alternative embodiment, the cameras may be combined such that the same set of cameras used for pallet classification are also used for protruding nail detection. That is, the cameras are not mutually exclusive.

Alternatively, if the inspected pallet 10 belongs to the pallet pooling company operating the pallet inspection system 140, then the pallet sort line 180 queries the processing unit 170 to determine if the pallet 10 is good or bad.

If the inspected pallet 10 is bad, this means that the pallet requires repair and is sent to a repair line 184. After repair, the pallet 10 is sent to a paint line 186 for painting before being returned to service. If the inspected pallet 10 is good, this means that the pallet does not require repair and is instead sent to the paint line 186 before being returned to service.

Figure 5:
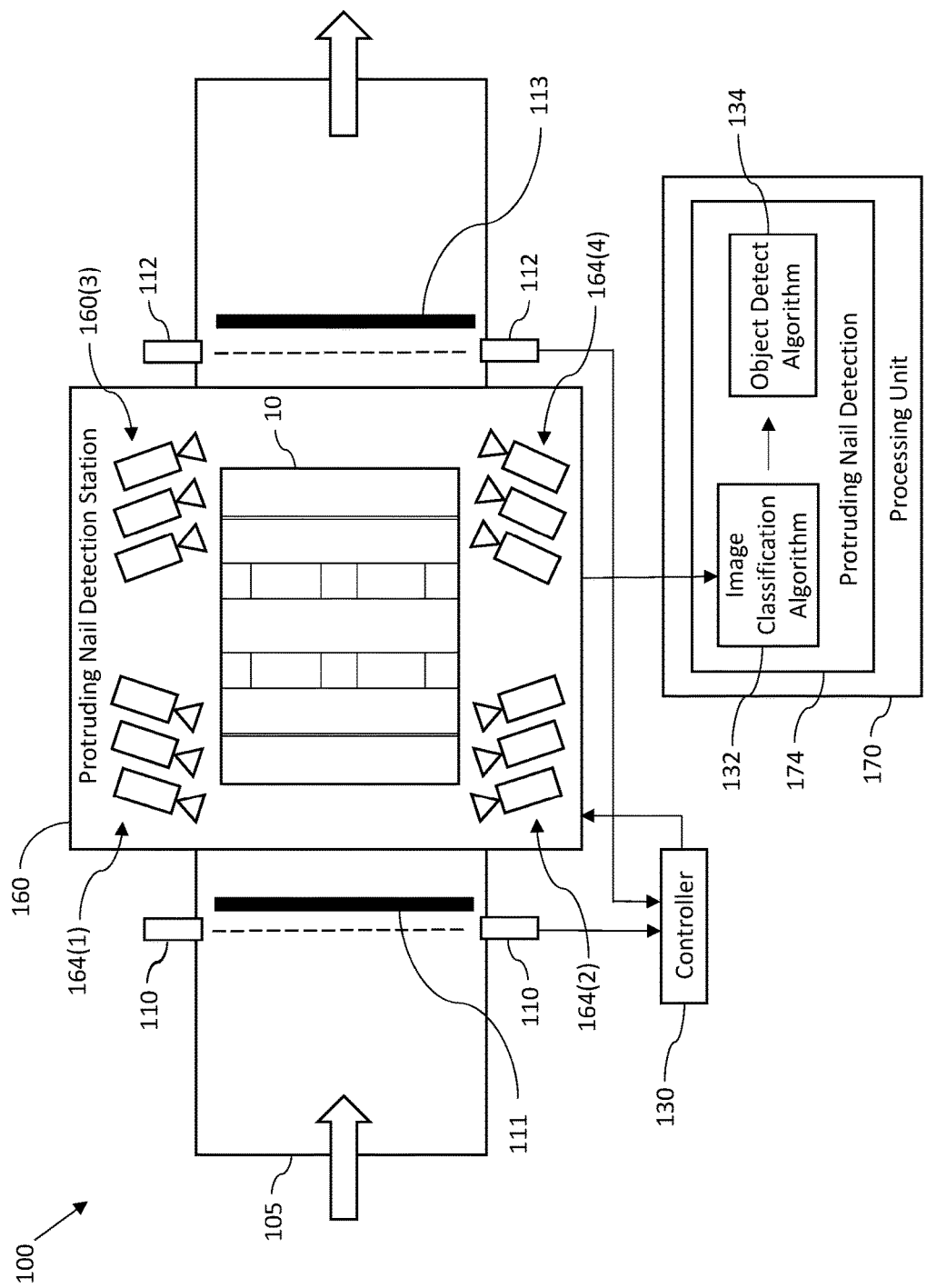
FIG. 5 is a more detailed block diagram of the protruding nail detection station illustrated in FIG. 4 for detecting protruding nails in a wooden pallet.

Referring to FIG. 5, operation of the protruding nail detection station 160 for detecting protruding nails 70 will be discussed. The conveyor 105 moves the pallet 10 through the protruding nail detection station 160 in the direction of the illustrated arrows. The conveyor 105 includes a first sensor 110 at the entrance of the protruding nail detection station 160, and a second sensor 112 at the exit of the protruding nail detection station 160. In other embodiments, a single sensor may be used. The first and second sensors 110, 112 may be configured as photoelectric sensors, for example. Each photoelectric sensor includes a transmitter and receiver on opposite sides of the conveyor 105. The transmitter transmits a light signal, which may be visible or infrared, to the receiver. The pallet 10 is detected when the light beam is blocked from getting to the receiver from the transmitter.

Output from the first and second sensors 110, 112 is provided to a controller 130. In response to receiving an output from the first and second sensors 110, 112, the controller 130 is configured to trigger the second set of cameras 164 as the pallet is being moved on the conveyor 105. The second set of cameras 164 are divided into a first camera set 164(1), 164(2) and a second camera set 164(1), 164(2).

The cameras in the first camera set 164(1), 164(2) are triggered by the first sensor 110. In response to the first sensor 110 detecting arrival of the pallet 10, a first stopper 111 in the path of the pallet 10 is dropped below the conveyor 105 to allow the pallet 10 to enter the protruding nail detection station 160. As the pallet 10 enters the protruding nail detection station 160, the controller 130 activates or triggers the cameras in the first camera set 164(1), 164(2) to provide images to the processing unit 170 for processing.

The images generated by the first camera set 164(1), 164(2) are a subset of the overall images received by the GPU 170 for the pallet 10. The remaining images received by the processing unit 170 are generated by the second camera set 164(3), 164(4).

The cameras in the first camera set 164(1), 164(2) are positioned to view a front perspective of the support blocks 40, 46. The cameras in the second camera set 164(3), 164(4) are positioned to view a rear perspective of the support blocks 40, 46. Collectively, the combined images are of all sides of each support block 40, 46.

The cameras in the second camera set 164(3), 164(4) are triggered by the second sensor 112. In response to the second sensor 112 detecting exit of the pallet 10, a second stopper 113 in the path of the pallet 10 is dropped below the conveyor 105 to allow the pallet 10 to exit the protruding nail detection station 160. As the pallet 10 exits the protruding nail detection station 160, the controller 130 activates or triggers the cameras in the second camera set 164(3), 164(4) to provide images to the processing unit 170 for processing.

Having two different triggers insures that a complete set of images of the support blocks 40, 46 are acquired. If the first and second camera sets 164(1)-164(4) were to be triggered at the same time by a single photoelectric sensor, and the conveyor 105 becomes jammed causing the pallet 10 to stop moving, then images on the rear perspective view of the support blocks 40, 46 would not be provided to the processing unit 170.

The first camera set 164(1), 164(2) includes 6 cameras, and the second camera set 164(3), 164(4) also includes 6 cameras. Half of the cameras are on each side of the conveyor 105. Even though 12 cameras are being used, a different number of cameras may be used in other embodiments.

The support blocks 40, 46 in each pallet 10 are spaced apart to form a pair of outer rows and a center row therebetween. The illustrated pallet includes 9 support blocks 40, 46 with 3 support blocks 40, 46 in each row. Each row is parallel with the conveyor 105. Each of the outer rows includes a pair of corner support blocks 40 and a center support block 46. The center row includes center support blocks 46 only.

Each camera in the first and second camera sets 164(1)-164(4) is focused on a particular row of support blocks. For example, camera group 164(1) includes 3 cameras. A first camera is focused on the outer row of support blocks 40, 46 closet to the camera group 164(1). A second camera is focused on the center row of support blocks 46. A third camera in focused on the outer row of support blocks 40, 46 farthest from the camera group 164(1). Similarly, each camera in camera group 164(2) on the opposite side of the conveyor 105 is focused on a particular row of support blocks 40, 46.

As noted above, the cameras in the first camera set 164(1), 164(2) are positioned to view a front perspective of the support blocks 40, 46. There is typically a delay between the 6 cameras in camera groups 164(1), 164(2) on when the support blocks 40, 46 in a particular row are in focus.

The pair of cameras focused on the outer row of support blocks 40, 46 closest to each respective camera come into focus first. This pair of cameras may be immediately triggered in response to the first sensor 110 detecting arrival of the pallet 10. The pair of cameras focused on the center row of support blocks 46 come into focus next since the center support blocks 46 are further away from the cameras. Consequently, this pair of cameras may be delayed 25 milliseconds, for example, before being triggered by the controller 130 to generate images. The pair of cameras focused on the outer row of support blocks 40, 46 farthest away come into focus next after the support blocks 46 in the center row come into focus since they are the farthest away from the cameras. Consequently, this pair of cameras may be delayed 50 milliseconds, for example, before being triggered by the controller 130 to generate images. Once a camera is triggered to provide images to the processing unit 170, the trigger lasts a predetermined time period. The predetermined time period may between 3 to 4 seconds, for example, and may be varied based on the speed of the conveyor 10.

The cameras in the second camera set 164(3), 164(4) are configured similar to the cameras in the first camera set 164(1), 164(2). Each camera in the second camera set 164(3), 164(4) is likewise focused on a particular row of support blocks. As noted above, the cameras in the second camera set 164(3), 164(4) are positioned to view a rear perspective of the support blocks 40, 46.

In response to the second sensor 112 detecting exit of the pallet 10 from the protruding nail detection station 160, the controller 130 may immediately trigger the pair of cameras focused on the outer row of support blocks 40, 46 closet to the respective cameras, and delay triggering of the pair of cameras focused on the center row of support blocks 46 and the pair of cameras focused on the outer row of support blocks 40, 46 farthest away from the respective cameras.

Operation of the processing unit 170 to detect protruding nails 80 from the received images is a two-step process. A first step is to determine the images having a support block 40, 46 therein that is in focus by one of the cameras. A second step is to analyze only the images having a focused support block 40, 46 therein for protruding nails 80.

The rational for determining the images with support blocks that are in focus is that a protruding nail 80 will be adjacent a support block 40, 46 since the nails 70 are driven into the support blocks 40, 46. The number of images to be analyzed for protruding nails 80 is significantly reduced by the first step.

Each camera may generate about 40 images per pallet 10. With 12 cameras, this corresponds to about 480 images per pallet. The actual number of images generated is variable, and can change from one deployment site to another. The processing unit 170 executes a first algorithm on the 480 images. The first algorithm may be an image classification algorithm 132, for example. The image classification algorithm 132 is trained using artificial intelligence (AI) and machine learning (ML) to determine images with focused support blocks 40, 46 therein.

If an image has a focused support block 40, 46 therein, it is tagged by the image classification algorithm 132. The image classification algorithm 132 functions as a pre-filter on the images provided by the second set of cameras 164 to the processing unit 170.

The tagged images are provided to a second algorithm, which may be an object detect algorithm 134, for example. The images that are not tagged are not passed to the object detect algorithm 134. As an example, out of the 480 images, about one-half to one-third of the images may not be tagged.

Execution of the object detect algorithm 134 is computationally more extensive then execution of the image classification algorithm 132. Reducing the number of images to be executed by the object detect algorithm 134 simplifies the overall processing to determine protruding nails 80.

The image classification algorithm 132 is trained to classify each image as a block image, a non-block image, or a background image. A block image corresponds to a support block 40, 46 that is in focus. A non-block image corresponds to a support block 40, 46 this is out-of-focus. A background image corresponds to neither a support block 40, 46 that is in focus or a support block 40, 46 that is out-of-focus.

Figure 6:
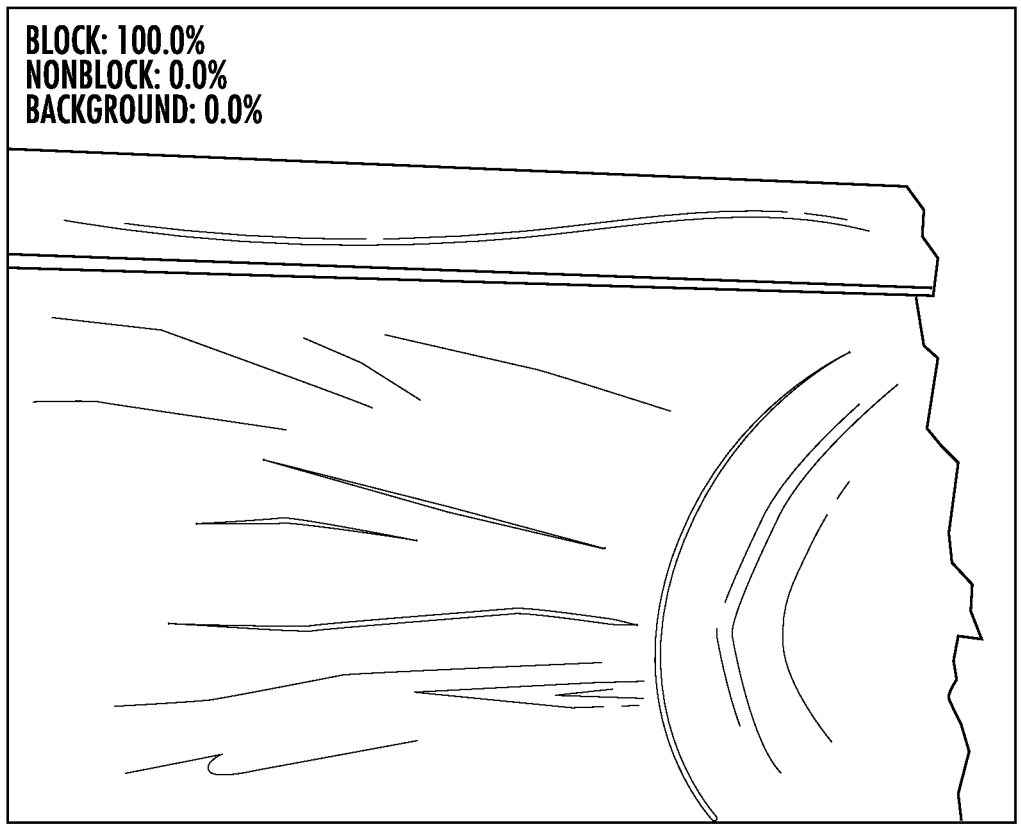
FIGS. 6-8 are images generated by the protruding nail detection station illustrated in FIG. 5 that have been classified by the image classification algorithm as a block image, a non-block image or a background image.
Figure 7:
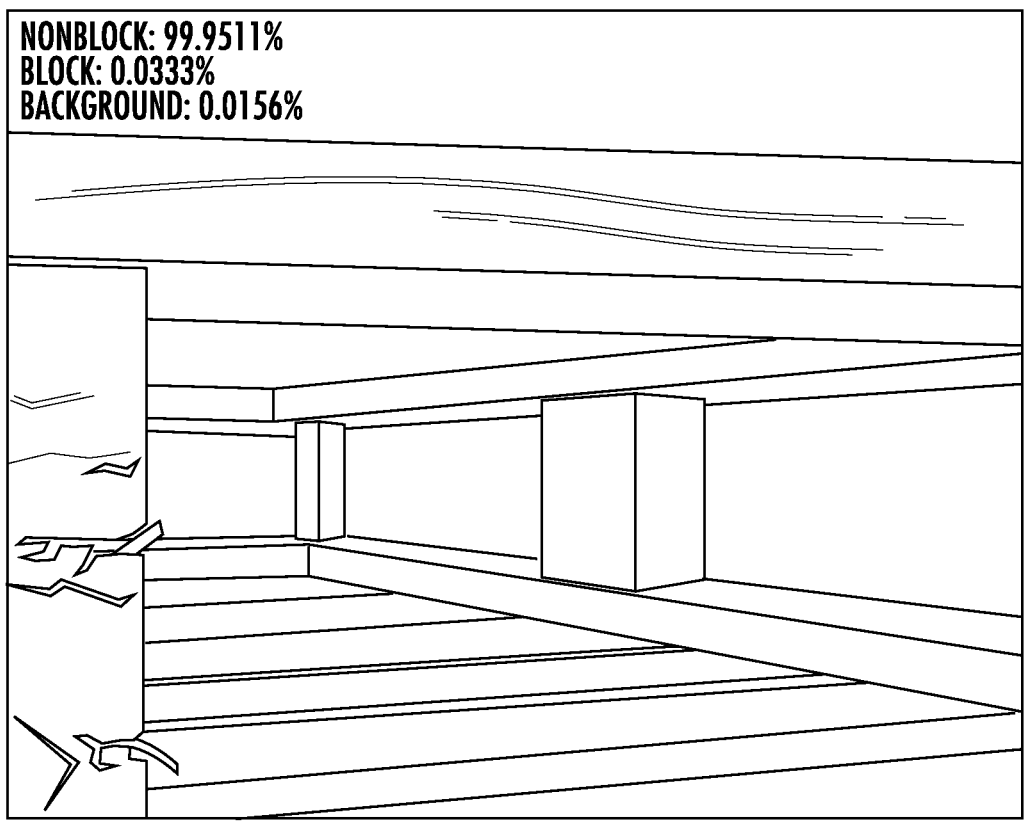
Figure 8:
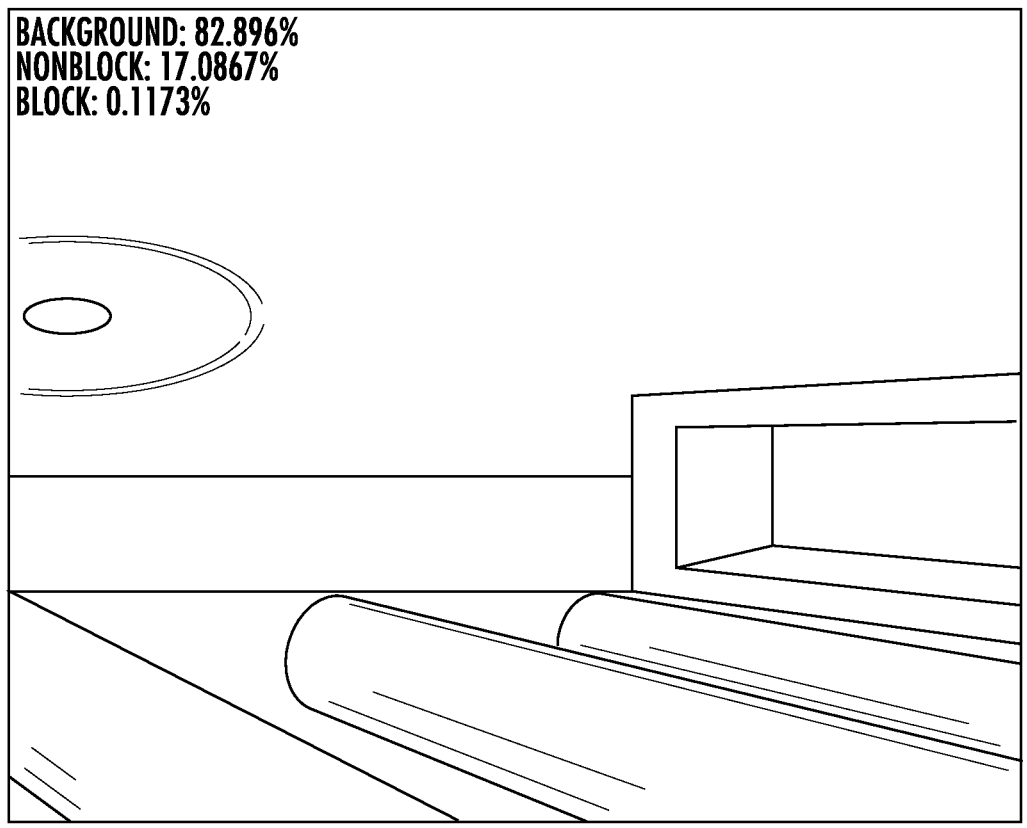

Referring now to FIGS. 6-8, images generated by the protruding nail detection station 160 that have been classified by the image classification algorithm 132 will be discussed. The image 200 in FIG. 6 is a block image since the support block 40 is in focus. The image 202 in FIG. 7 is a non-block image since the support block 40 is out-of-focus. The image 204 in FIG. 8 is a background image since an in focus or out-of-focus support block is not visible. A background image is typically generated when the pallet 10 first arrives at the protruding nail detection station 160, and when the pallet 10 exits the protruding nail detection station 160.

The image classification algorithm 132 uses percentages to classify each image. The classification percentage varies as the pallet moves 10 on the conveyor 105. The classification percentages are displayed for each image and are to total 100%. A percentage number is assigned by the image classification algorithm 132 to each of the three possible classifications. In response to a classification percentage being over a threshold, such as 75%, for example, the image classification algorithm 132 will classify the image accordingly.

In image 200, classification as a block image is 100% whereas classification as a non-block image or a background image are each 0%. In image 202, a non-block image is classified as 99.9511%, whereas classification as a block image is 0.0333% and as a background image as 0.0156%.

In image 204, a background image is classified as 82.796%, whereas classification as a non-block image is 17.0867% and as a block image as 0.1173%. In this image 204, the pallet 10 is partially visible as it is exiting the protruding nail detection station 160.

The tagged images that have a focused support block 40, 46 will be generally referred to as tagged images 200. These images are passed to the object detect algorithm 134 for processing. Instead of tagging the images, the object detect algorithm 134 is trained to locate objects within the tagged images 200. The objects to be located are support blocks and visible nails overlapping with the support blocks. The visible nails 70 may be protruding nails 80 or may be nails 70 where the body of the nail is visible but not the tip.

As will be discussed below, the object detect algorithm 134 is trained using annotated images that include a number of different categories that are to be detected, where each category corresponds to a particular type object to be detected and located. By learning the different categories, the object detect algorithm 134 will be able to differentiate between a protruding nail that is to be corrected and other types of nail defects that do not need to be corrected. The different categories provide contextual details to the object detect algorithm 134.

Figure 9:
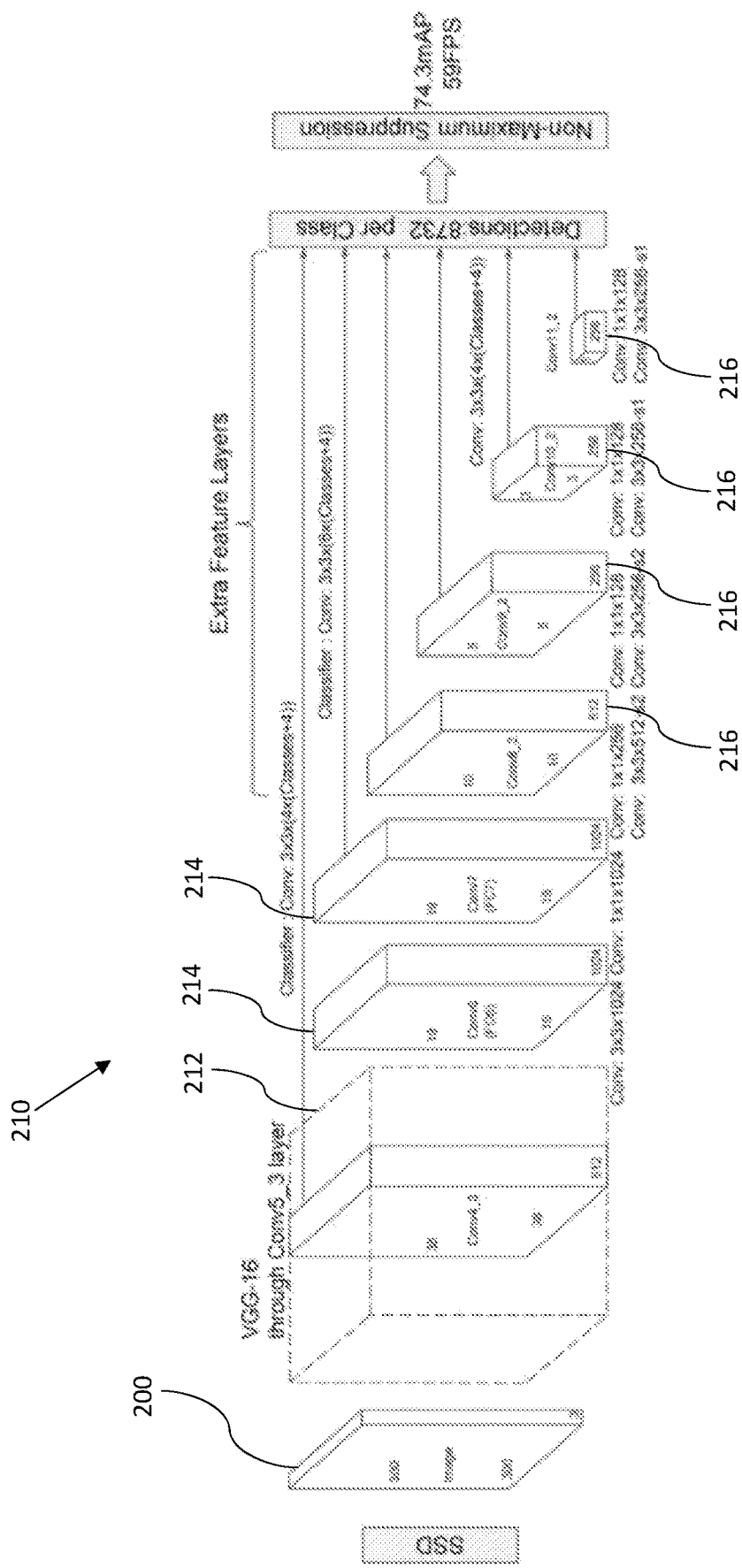
FIG. 9 is a block diagram of example object detect algorithm used by the protruding nail detection station illustrated in FIG. 5 for detecting protruding nails in a wooden pallet.

The object detect algorithm 134 may operate based on artificial intelligence (AI) and machine learning (ML) to determine objects within the images 200 having the focused support blocks 40, 46 therein. In one example, the object detect algorithm 134 may be a single shot detector (SSD) 210 as illustrated in FIG. 9. Other types of object detectors may be used as an alternative to the illustrated SSD 210. In the SSD 210, only one single shot is taken of the image 200 to detect multiple objects within the image 200. The SSD 210 is an open source algorithm modified to detect protruding nails 80.

A SSD 210, in general, has a base VGG-16 network 212 followed by multibox convolution layers 214, 216. The base VGG-16 network 212 is used to extract features within an image 200. Convolutional layers 214 are for detection, and convolutional layers 216 help with detection of objects at multiple scales since these layers decrease in size progressively. The convolutional model for detection is different for each feature layer.

The multibox convolution layers 214, 216 are applied to multiple feature maps from the later stages of a network. This helps perform detection at multiple scales. Prediction for the bounding boxes and confidence for different objects in the image 200 is done not by one but by multiple feature maps of different sizes that represent multiple scales.

The problem of detecting protruding nails can be addressed in different ways. One way is to use object detection using bounding boxes, as will be discussed below. In another way, a segmentation approach to segment pixels may be used to define a contour of protruding nail pixels in an image. In yet another way, the algorithm may be trained to detect regions using both bounding boxes and segmentation pixels.

Figure 10:
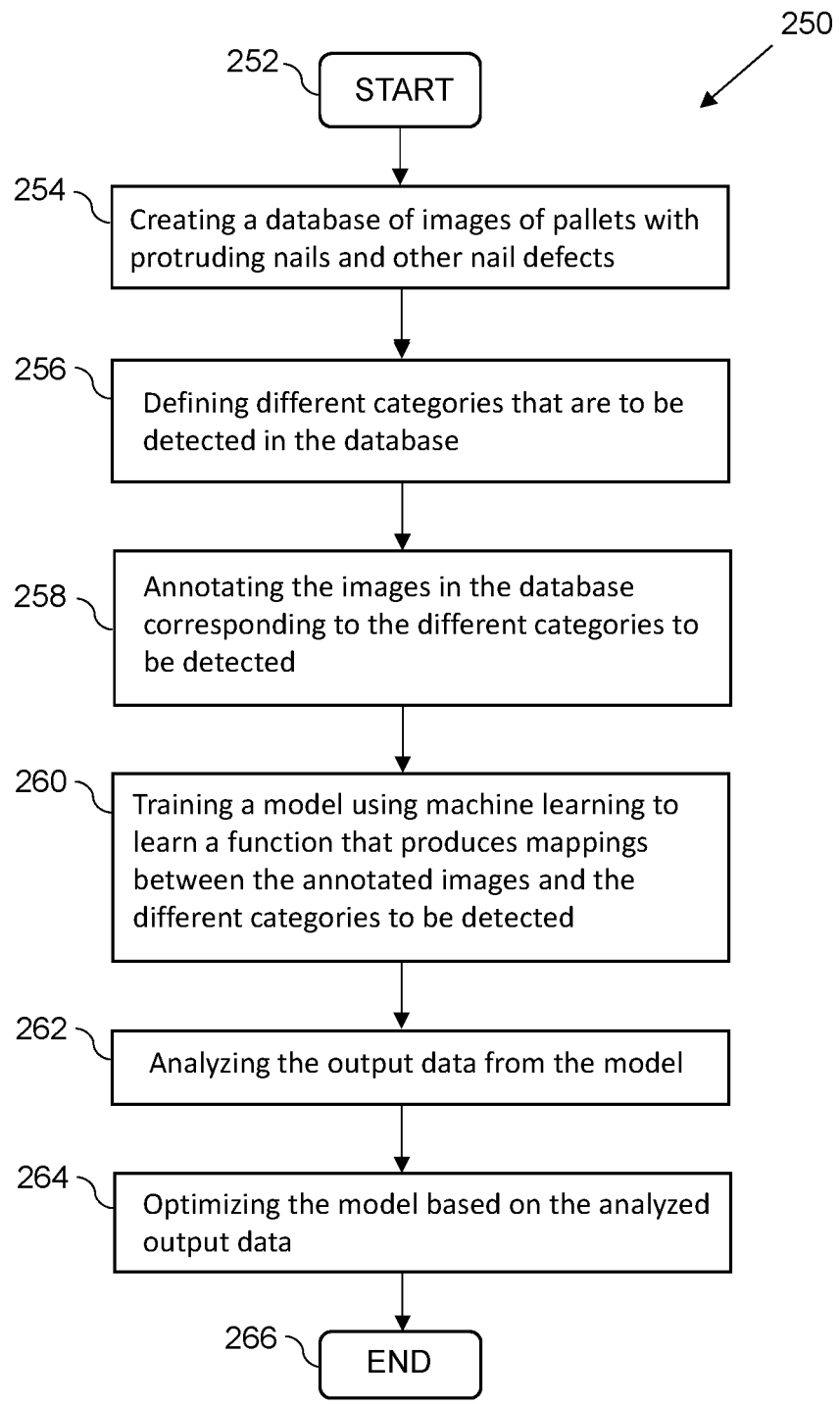
FIG. 10 is a flow diagram for training the object detect algorithm illustrated in FIG. 9.

Referring now to the flow diagram 250 in FIG. 10, training of the object detect algorithm 134 will be discussed. From the start (Block 252), a database of images of pallets 10 with protruding nails 70 and other nail defects is created at Block 254. The number of pallets 10 may be rather large, such as 100 or more, for example. The images from all 12 cameras for each pallet 10 are collected and stored in the database. There are about 480 images associated with each pallet 10.

The different categories that are to be detected are defined at Block 256. These categories include support blocks, protruding nails, partially visible nails, clinched nails, free standing nails, and splinters. Other types of categories may be defined to help the object detect algorithm 134 detect protruding nails 80.

The images in the database are annotated at Block 258 to reflect the different categories to be detected. Each image is manually reviewed, and if the image has a category that is to be detected by the object detect algorithm 134, then the image is annotated with a bounding box and labeled accordingly.

Figure 11:
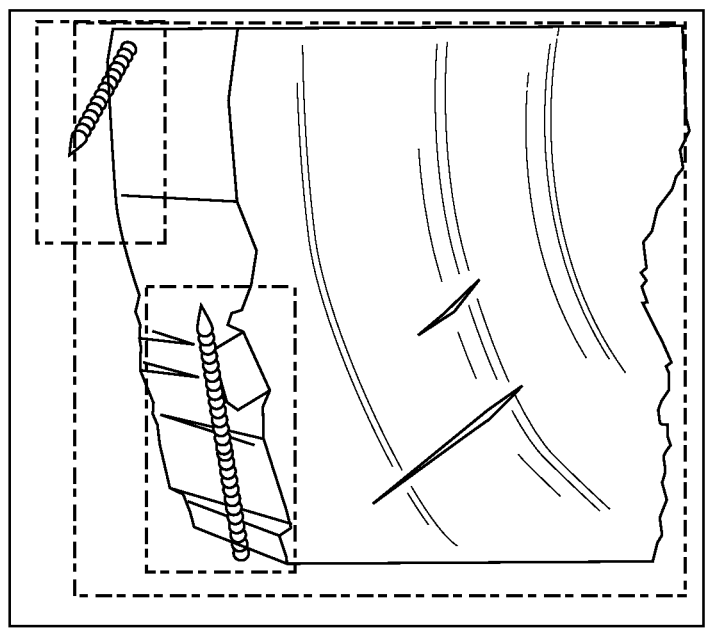
FIGS. 11-13 are annotated images used to train the object detect algorithm illustrated in FIG. 9.
Figure 12:
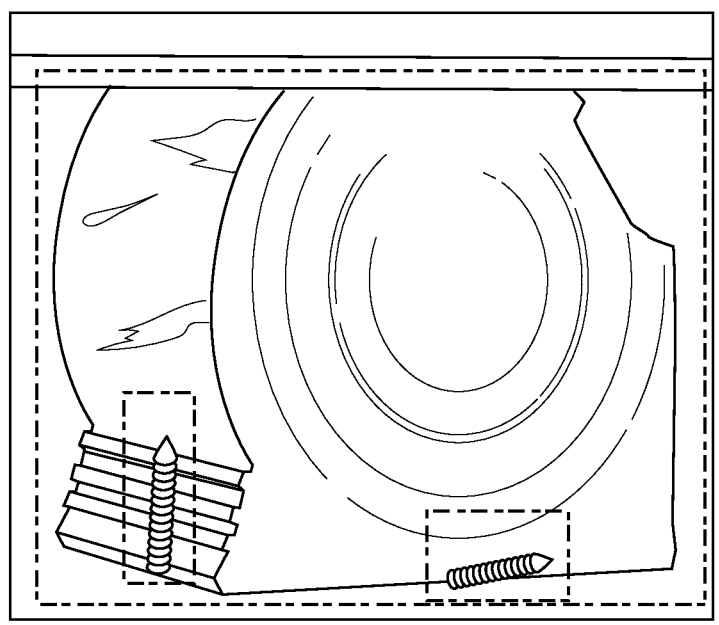
Figure 13:
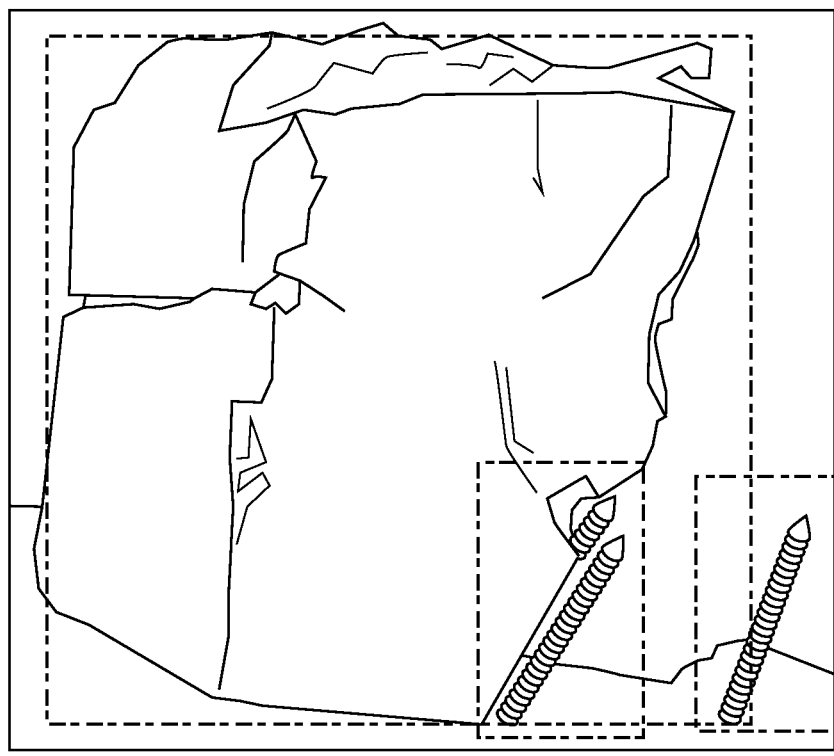

Example images that have been annotated are provided in FIGS. 11-13. A green bounding box 202 is placed around each support block 40, 46. For protruding nails 80, a red bounding box 204 is used. In response to a detected nail not being a protruding nail, a yellow bounding box is used. In FIG. 12, for example, a yellow bounding box 206 is placed around a nail 70 having the body of the nail being visible but not the tip. The support block 40 in FIG. 13 is splintered resulting in a pair of protruding nails 80 being visible.

Detecting splintered support blocks is helpful. At times it could be hard to differentiate between a splintered support block and a nail that has been colored. Normally, the nail would appear as a gray/block color. However, if the splintered support block was not detected earlier and the pallet was sent to paint, now the exposed nail is painted the same color as the block.

In addition to detecting nail defects and splintered support blocks, the images may be annotated for identifying other types of defects. The images may be annotated for detecting stickers and stretch wrap, for example, that remain on the pallet 10. Normally, each pallet 10 is visually inspected by a human operator to remove any loose debris or trash that may affect inspection. Adding sticker and shrink wrap detection helps to identify such areas that may not be caught during the visual inspection of each pallet 10.

A model is trained at Block 260 using machine learning to learn a function that produces mappings between the annotated images and the different categories to be detected. In some embodiments, the machine learning may be based on a neural network to train the model. In other embodiments, a neural network is not used to train the model. Since a neural network based model/algorithm or another type of non-neural network based model/algorithm may be used, we are not limited to a single or a set of algorithms.

The output data from the model is analyzed at Block 262. The model is optimized at Block 264 based on the analyzed output data. The method ends at Block 266

Figure 14:
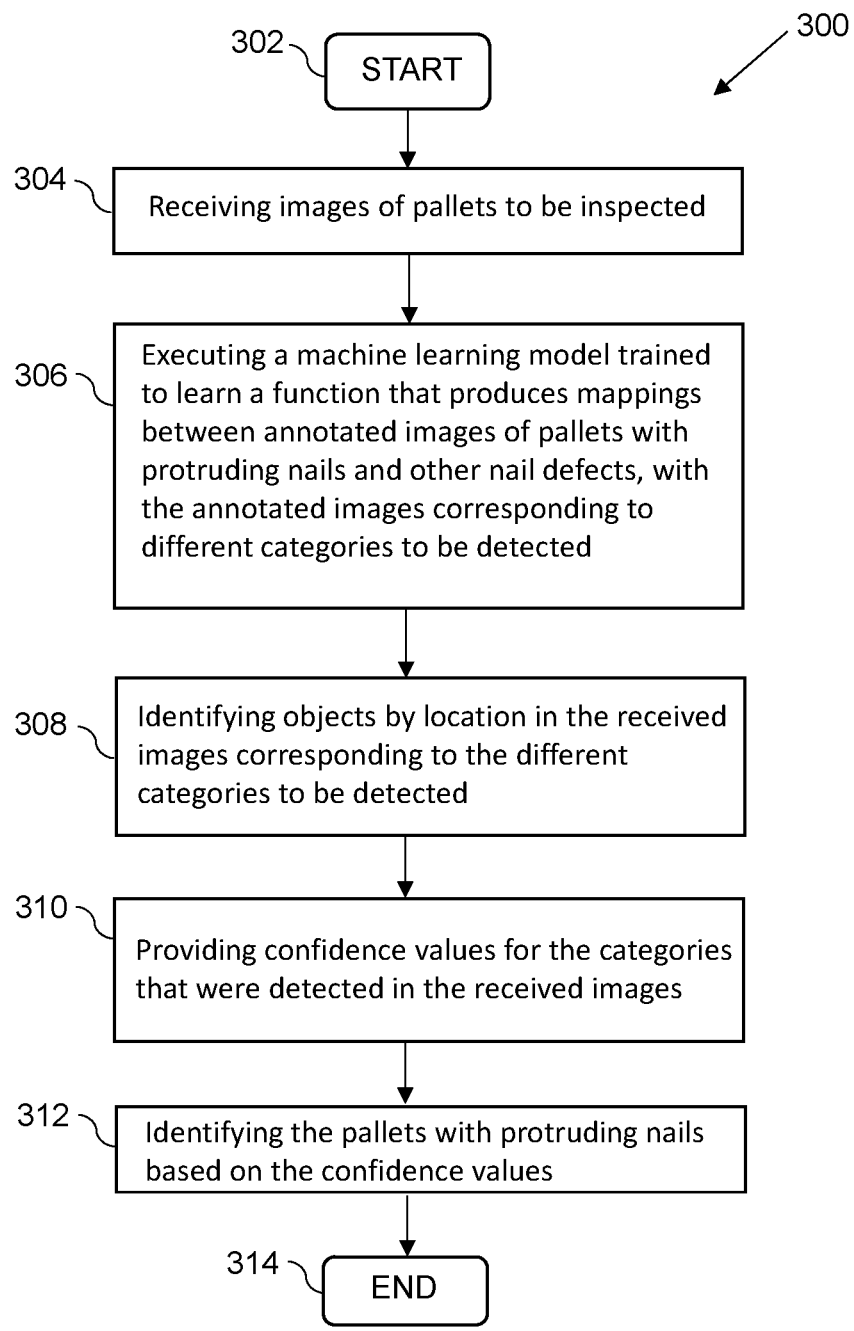
FIG. 14 is a flow diagram for operating the object detect algorithm illustrated in FIG. 9.

Referring now to the flow diagram 300 in FIG. 14, operating the object detect algorithm 134 will be discussed. From the start (Block 302), images of pallets 10 to be inspected are received at Block 304. The images are the images 200 that were tagged by the image classification algorithm 132 as having a focused support block 40, 46 therein.

At Block 306, the method includes executing a machine learning model that has been trained to learn a function that produces mappings between annotated images of pallets 10 with protruding nails 80 and other nail defects to be detected. The annotated images correspond to the different categories to be detected, as discussed above.

Detected objects corresponding to the different categories to be detected in the images 200 are identified by location at Block 308. A bounding box is placed around each identified object. Example images that have detected objects are provided in FIGS. 15-17.

Figure 15:
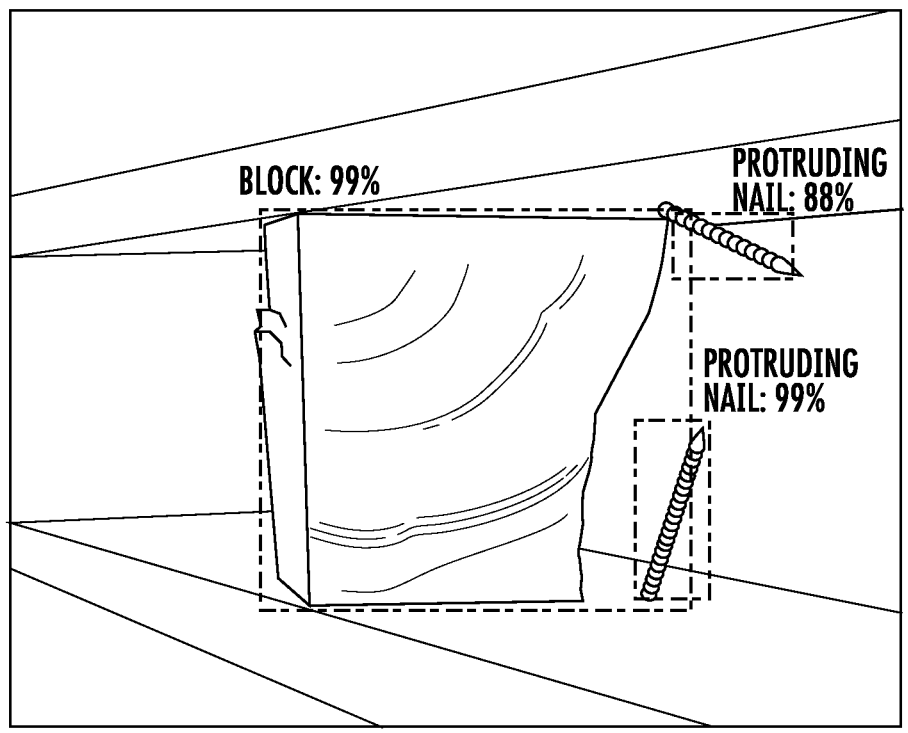
FIGS. 15-17 are image outputs from the object detect algorithm illustrated in FIG. 9.
Figure 16:
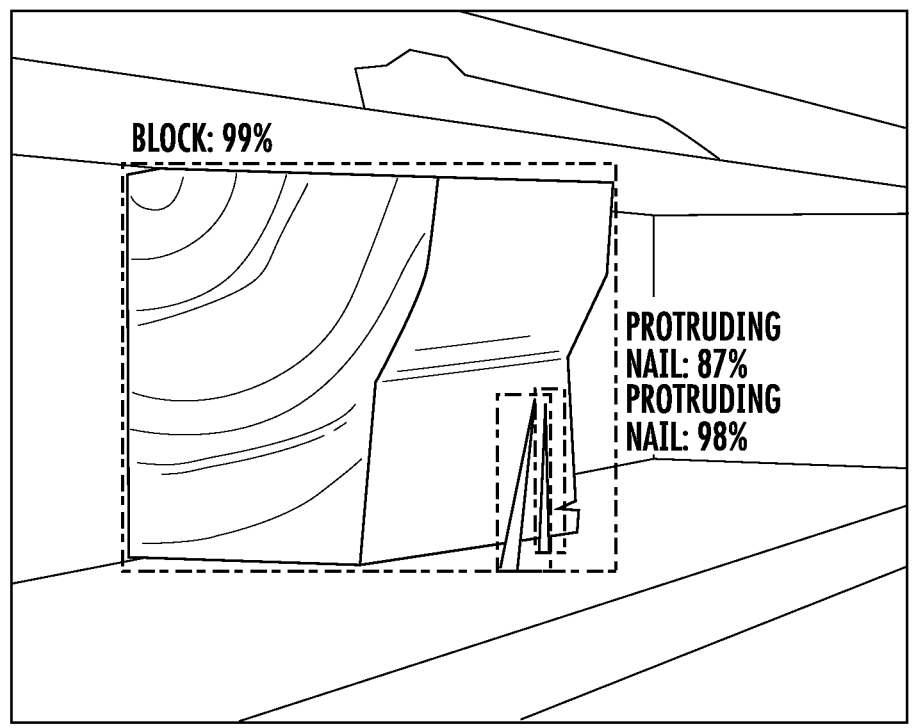

In the image 320 in FIG. 15, a bounding box 330 is placed around the support block 46. The support block 46 has been detected even though a chunk of wood has been removed. For the protruding nails 80, separate bounding boxes 332, 334 are used. Similarly, in the image 322 in FIG. 16, a bounding box 336 is placed around the splintered support block 46. For the protruding nails 80, separate bounding boxes 338, 340 are used.

Figure 17:
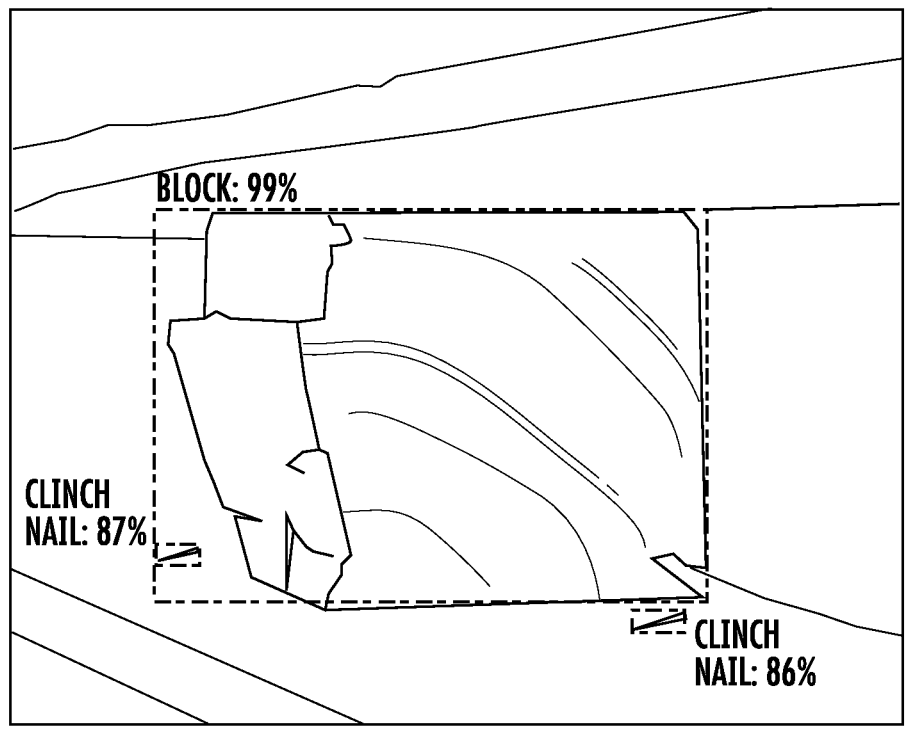

As another example, in the image 324 in FIG. 17, a bounding box 342 is placed around the splintered support block 46. A pair of clinched nails 71 have been detected where the tips are exposed. In this case, bounding boxes 344, 346 are placed around the clinched nails 71. The body of a nail 70 is visible within the image 324, but since the tip of the nail is not exposed, this nail is ignored.

For each bonding box, a location in pixels is determined by the object detect algorithm 134. For example, the image 320 in FIG. 15 is 1,000 pixels by 1,000 pixels. The 0, 0 coordinates, for example, are at the bottom left of the image 320. The x-axis of the bounding box 330 around the support block 46 starts at 250 pixels, and the y-axis of the bounding box 330 starts at 100 pixels. A width and height of the bounding box 330 is then determined.

Similarly, for the bounding box 334 indicating a protruding nail 80, the x-axis starts at 720 pixels, and the y-axis of the bounding box 334 starts at 110 pixels. A width and height of the bounding box 334 is then determined. This is performed for each bounding box.

The method further includes providing confidence values at Block 310 for the categories that were detected in the received images 322, 322, 324. The confidence value for each of the support blocks is 99%. The confidence value also has the detected category associated therewith. The work "block" is used to indicate a support block 40, 46.

A "protruding nail" label and a confidence value of each detected protruding nail are also provided. With the object detect algorithm 134 having been trained to contextual observe each image, protruding nails 80 typically have a high confidence value. In the examples, the confidence vales range from 87% to 99%. For the clinched nails 71 in the image 324, a "clinch nail" label and a confidence value are provided.

The pallets 10 with protruding nails 80 are identified based on the confidence values at Block 312. If the confidence value is above a threshold, such as 75%, then each bounding box is labeled accordingly. The method ends at Block 314.

Figure 18:
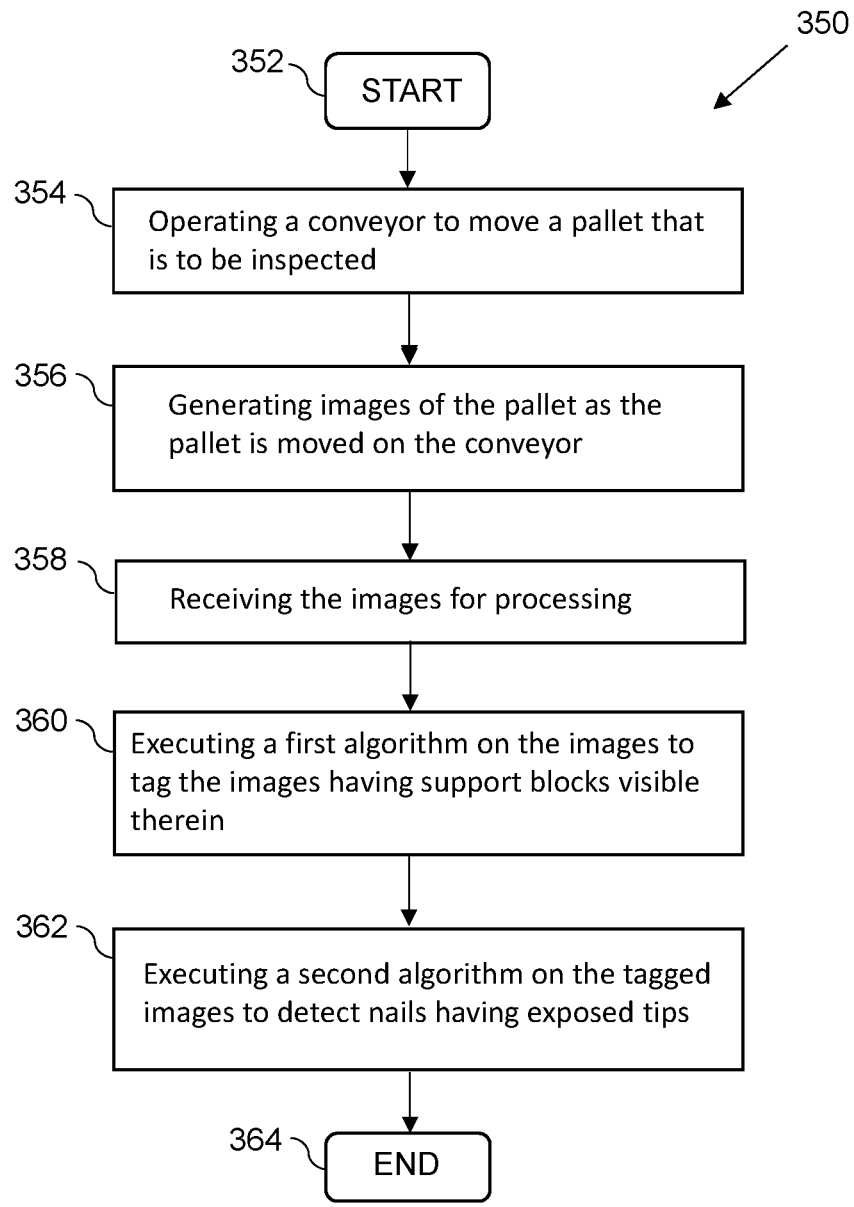
FIG. 18 is a flow diagram for operating the pallet inspection system illustrated in FIG. 4.

Another aspect is directed to a method for operating the pallet inspection system 140 as described above. Referring now to the flow diagram 350 in FIG. 18, from the start (Block 352), the method includes operating a conveyor 105 at Block 354 to move a pallet 10 that is to be inspected. As described above, the pallet 10 includes a top deck 30 and a bottom deck 20 separated by a plurality of spaced apart support blocks 40, 46 positioned therebetween. Nails 70 are used to secure the top and bottom decks 30, 20 to the support blocks 40, 46.

Cameras 162, 164 positioned adjacent the conveyor 105 are operated at Block 356 to generate images of the pallet 10 as the pallet 10 is moved on the conveyor 105. The images are received by the processing unit 170 at Block 358 for processing.

The processing includes executing a first algorithm 132 at Block 360 on the images to tag the images having support blocks 40, 46 visible therein. At Block 362, a second algorithm 134 is executed on the tagged images to detect nails 70 having exposed tips 72. The first algorithm 132 is an image classification algorithm, and the second algorithm 134 is an object detection algorithm. The method ends at Block 364.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A pallet inspection system comprising:
 a conveyor configured to move a pallet that is to be inspected, the pallet comprising a top deck and a bottom deck separated by a plurality of spaced apart support blocks positioned therebetween, with nails being used to secure the top and bottom decks to the plurality of support blocks;
 a plurality of cameras positioned to generate images of the pallet as the pallet is moved on said conveyor; and
 a processor coupled to said plurality of cameras and configured to receive the images for processing, the processing comprising
  executing a first algorithm on the images to tag the images having support blocks visible therein, and
  executing a second algorithm on the tagged images to detect nails having exposed tips.

2. The pallet inspection system according to claim 1, further comprising a first sensor positioned before the plurality of cameras, and a second sensor positioned after the plurality of cameras, and wherein said processor is configured to
 receive a first set of images of the pallet in response to the first sensor being activated; and
 receive a second set of images of the pallet in response to the second sensor being activated.

3. The pallet inspection system according to claim 2, wherein the first and second sensors comprise photoelectric sensors.

4. The pallet inspection system according to claim 1, wherein the first and second algorithms are executed by said processor so that nails having exposed tips are detected in real time.

5. The pallet inspection system according to claim 1, wherein the plurality of support blocks are spaced apart to form a pair of outer rows and a center row therebetween, with the outer rows including corner support blocks, and wherein each camera is in focus on the support blocks in one of the rows and out-of-focus on the support blocks in the other rows.

6. The pallet inspection system according to claim 1, wherein said plurality of cameras are divided into first and second camera sets, with the first camera set being directed toward an entrance of the pallet inspection system station, and the second camera set being directed toward an exit of the pallet inspection system station.

7. The pallet inspection system according to claim 6, wherein the first camera set provides a front perspective of the plurality of support blocks, and the second camera set provides a rear perspective of the plurality of support blocks, with the first and second camera sets collectively providing images on all sides of each support block.

8. The pallet inspection system according to claim 6, wherein the first camera set includes cameras adjacent each side of the conveyor, and the second camera set includes cameras adjacent each side of the conveyor.

9. The pallet inspection system according to claim 1, wherein each camera is configured as a color camera.

10. The pallet inspection system according to claim 1, wherein the first algorithm comprises an image classification algorithm, and the second algorithm comprises an object detection algorithm.

11. The pallet inspection system according to claim 10, wherein the image classification algorithm is configured to classify each image as one of the following:
- a block image corresponding to a support block being in focus;
- a non-block image corresponding to a support block being out-of-focus; or
- a background image corresponding to neither a support block being in focus or a support block being out-of-focus; and
- with the block images being tagged by the image classification algorithm.

12. The pallet inspection system according to claim 11, wherein the object detection algorithm is configured to place a bounding box around the support block in each block image, and in response to an exposed nail tip being detected, place a bounding box around the exposed nail tip.

13. The pallet inspection system according to claim 11, wherein the object detection algorithm is configured to detect other nail defects in addition to nails having exposed tips, with the other nail defects being ignored by said processor.

14. A method for operating a pallet inspection station comprising:
- operating a conveyor to move a pallet that is to be inspected, the pallet comprising a top deck and a bottom deck separated by a plurality of spaced apart support blocks positioned therebetween, with nails being used to secure the top and bottom decks to the plurality of support blocks;
- operating a plurality of cameras positioned to generate images of the pallet as the pallet is moved on the conveyor; and
- receiving the images for processing, the processing comprising
  - executing a first algorithm on the images to tag the images having support blocks visible therein, and
  - executing a second algorithm on the tagged images to detect nails having exposed tips.

15. The method according to claim 14, wherein the pallet inspection station further comprises a first sensor positioned before the plurality of cameras, and a second sensor positioned after the plurality of cameras, the method further comprising:
- receiving a first set of images of the pallet in response to the first sensor being activated; and
- receiving a second set of images of the pallet in response to the second sensor being activated.

16. The method according to claim 14, wherein the plurality of support blocks are spaced apart to form a pair of outer rows and a center row therebetween, with the outer rows including corner support blocks, and wherein each camera is in focus on the support blocks in one of the rows and out-of-focus on the support blocks in the other rows.

17. The method according to claim 14, wherein the first algorithm comprises an image classification algorithm, and the second algorithm comprises an object detection algorithm.

18. The method according to claim 17, wherein the image classification algorithm is configured to classify each image as one of the following:
- a block image corresponding to a support block being in focus;
- a non-block image corresponding to a support block being out-of-focus; or
- a background image corresponding to neither a support block being in focus or a support block being out-of-focus; and
- with the block images being tagged by the image classification algorithm.

19. The method according to claim 17, wherein the object detection algorithm is configured to place a bounding box around the support block in each block image, and in response to an exposed nail tip being detected, place a bounding box around the exposed nail tip.

* * * * *